United States Patent [19]

Richards

[11] 4,335,733

[45] Jun. 22, 1982

[54] VALVE FOR USE IN HANDLING ABRASIVE MATERIALS AND METHOD OF WEAR PREVENTION

[76] Inventor: John A. Richards, 1611 Sierra Alta, Santa Ana, Calif. 92705

[21] Appl. No.: 76,452

[22] Filed: Sep. 17, 1979

[51] Int. Cl.$^3$ ............................................. F16K 25/00
[52] U.S. Cl. ..................................... 137/1; 91/170 R;
91/533; 92/117 A; 92/146; 251/62; 251/172;
251/327; 251/328; 251/360
[58] Field of Search .................. 92/62, 110, 146, 151,
92/117 R, 117 A; 137/1, 240; 251/62, 63.5, 172,
175, 195, 326, 327, 328, 360, 315; 91/170, 533

[56] References Cited

U.S. PATENT DOCUMENTS

| | | | |
|---|---|---|---|
| 703,583 | 7/1902 | Hirt | 251/172 |
| 2,230,600 | 2/1941 | Olson | 251/360 |
| 2,299,430 | 10/1942 | Sexton | 92/110 |
| 2,444,474 | 7/1948 | Somes et al. | 92/117 A |
| 2,630,293 | 3/1953 | Smith | 137/240 |
| 2,726,842 | 12/1955 | Seamark | 251/172 |
| 2,852,062 | 9/1958 | Lorant | 92/75 |
| 2,922,399 | 1/1960 | Panissidi et al. | 92/110 |
| 3,109,457 | 11/1963 | Oliveau | 251/172 |
| 3,145,969 | 8/1964 | Von Zweck | 251/172 |
| 3,206,162 | 9/1965 | Bogot | 251/172 |
| 3,207,174 | 9/1965 | Berczynski | 251/328 |
| 3,405,911 | 10/1968 | Bolling, Jr. | 251/172 |
| 3,425,322 | 2/1969 | Zucchellini | 92/146 |
| 3,568,559 | 3/1971 | Fink | 92/117 A |
| 3,640,303 | 2/1972 | Verheul | 251/62 |
| 4,068,822 | 1/1978 | Richards | 251/315 |
| 4,070,161 | 1/1978 | Harter | 251/328 |
| 4,174,728 | 11/1979 | Usnick et al. | 137/240 |
| 4,178,838 | 12/1979 | Stafford | 92/117 A |
| 4,292,992 | 10/1981 | Bhidé | 137/240 |

Primary Examiner—George L. Walton
Attorney, Agent, or Firm—Harry W. F. Glemser

[57] ABSTRACT

A valve, comprising: a cylindrical casing, closed at its ends by covers, and having axially aligned inlet and outlet chambers midway of its length disposed at right angles to the axis of the casing. Communication between said chambers is controlled by a ported, fluid pressure operated, movable valve plate assembly, including parallel cylinders, each containing a stationary piston connected to the inner end of a pair of axially aligned rods, or guides, fixed at their outer end to the covers. Each rod has a passageway communicating at its inner end with one end of its associated cylinder for supplying operating fluid thereto to bodily reciprocate the valve plate assembly on said rods within the casing. An adjustable collar positions a fixed wear plate in sealing engagement with one side of the valve plate assembly, and a fluid pressure actuated loading ring urges a floating wear plate into contact with the other side of said valve plate assembly. The casing may be pressurized by gas or liquid, but in any event, such pressure is maintained equal to or preferably slightly lower than the fluid pressure applied to the loading ring, but higher than the pressure in the system in which the valve is installed. With such pressure relationship, any abrasive material being handled by the system is prevented from entering between the movable valve plate assembly and the fixed and floating wear plates, respectively, thereby eliminating or reducing leakage and wear to a minimum. When liquid is used as the casing pressurizing fluid and/or the operating fluid supplied to the cylinders, it is preferably filtered, and may also be circulated through heat exchange means, if cooling thereof is necessary or desirable.

The invention further includes a method of preventing abrasion, i.e., scoring and galling of the valve seating surfaces when the valve is installed in a system handling abrasive material.

27 Claims, 11 Drawing Figures

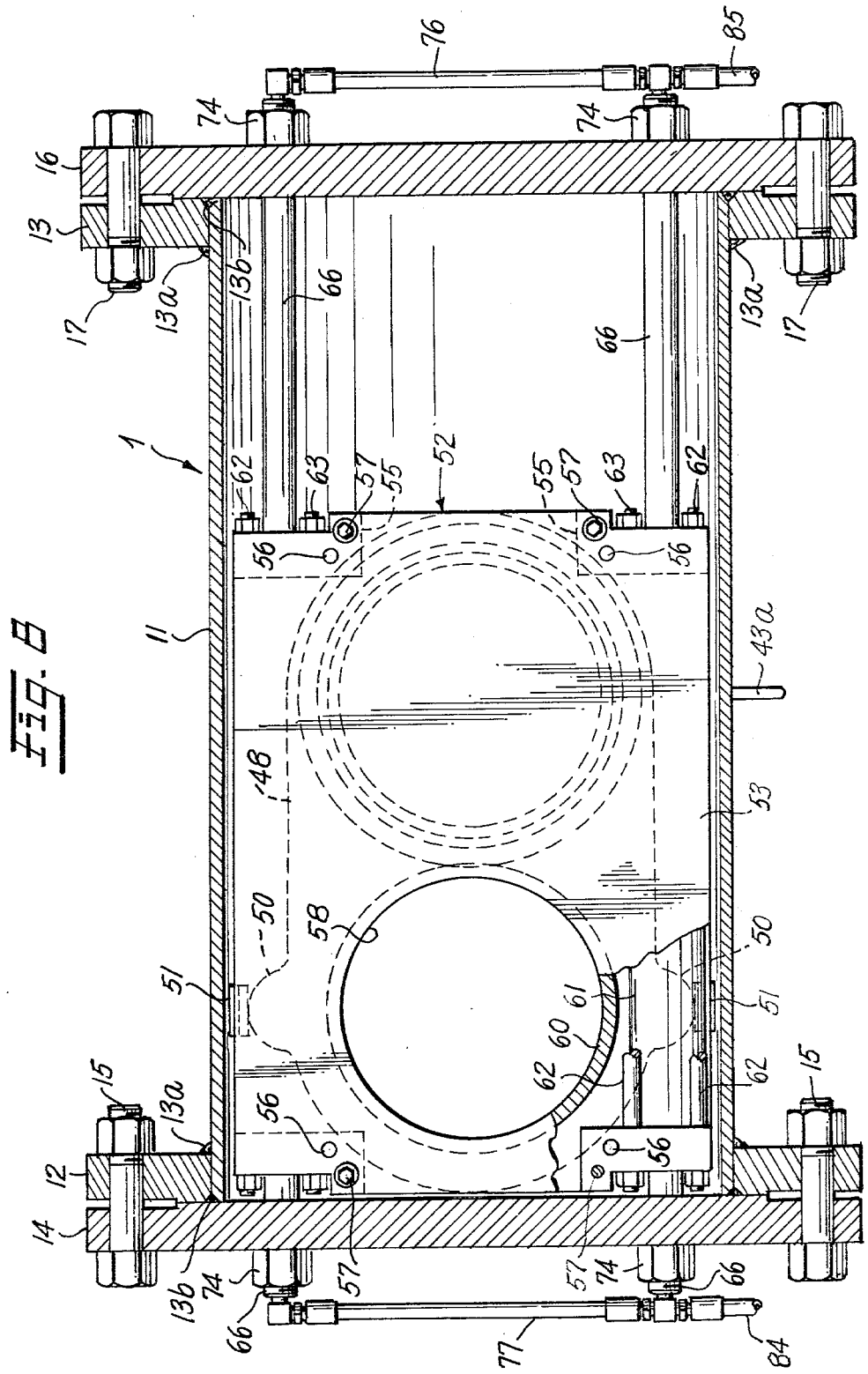

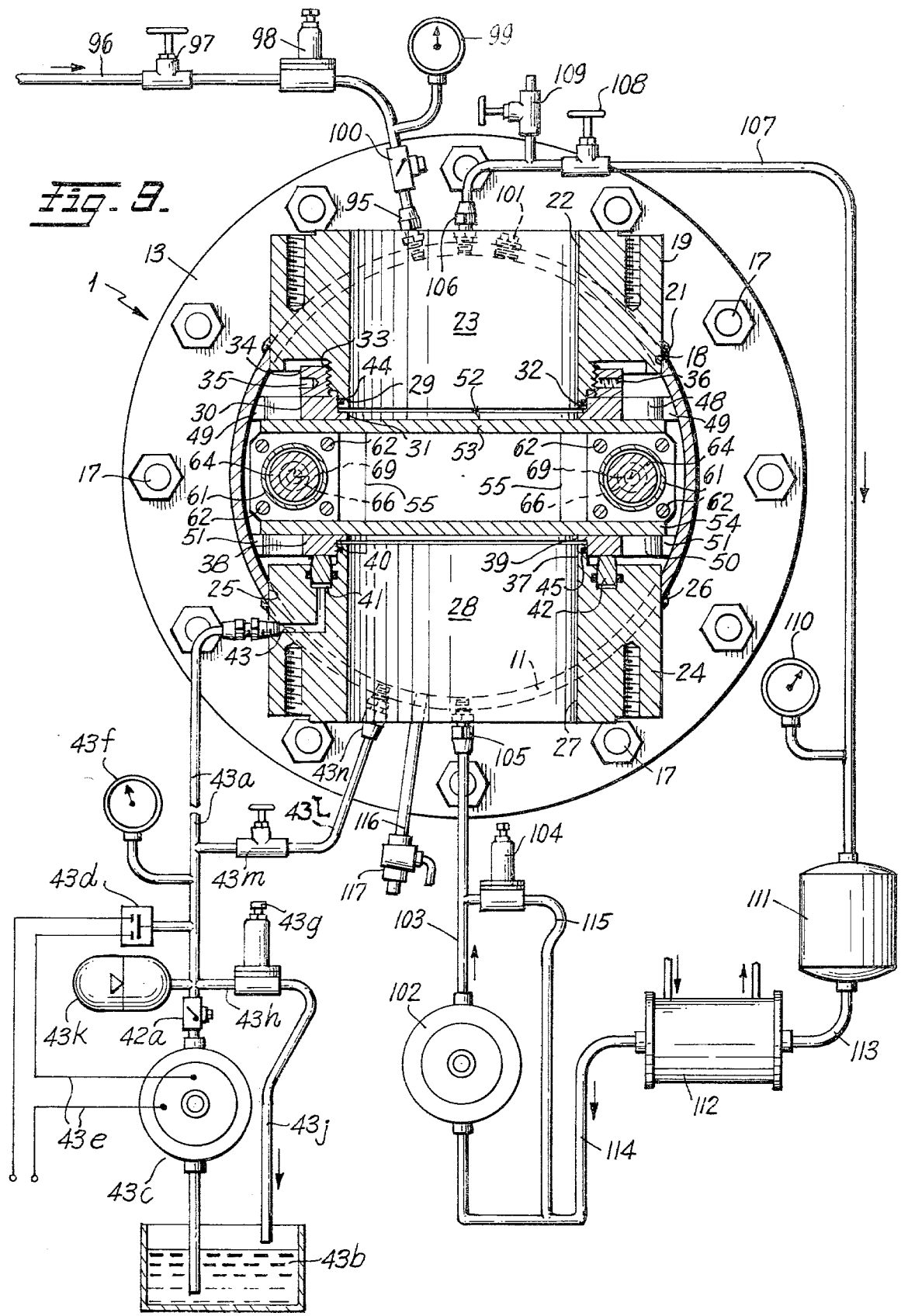

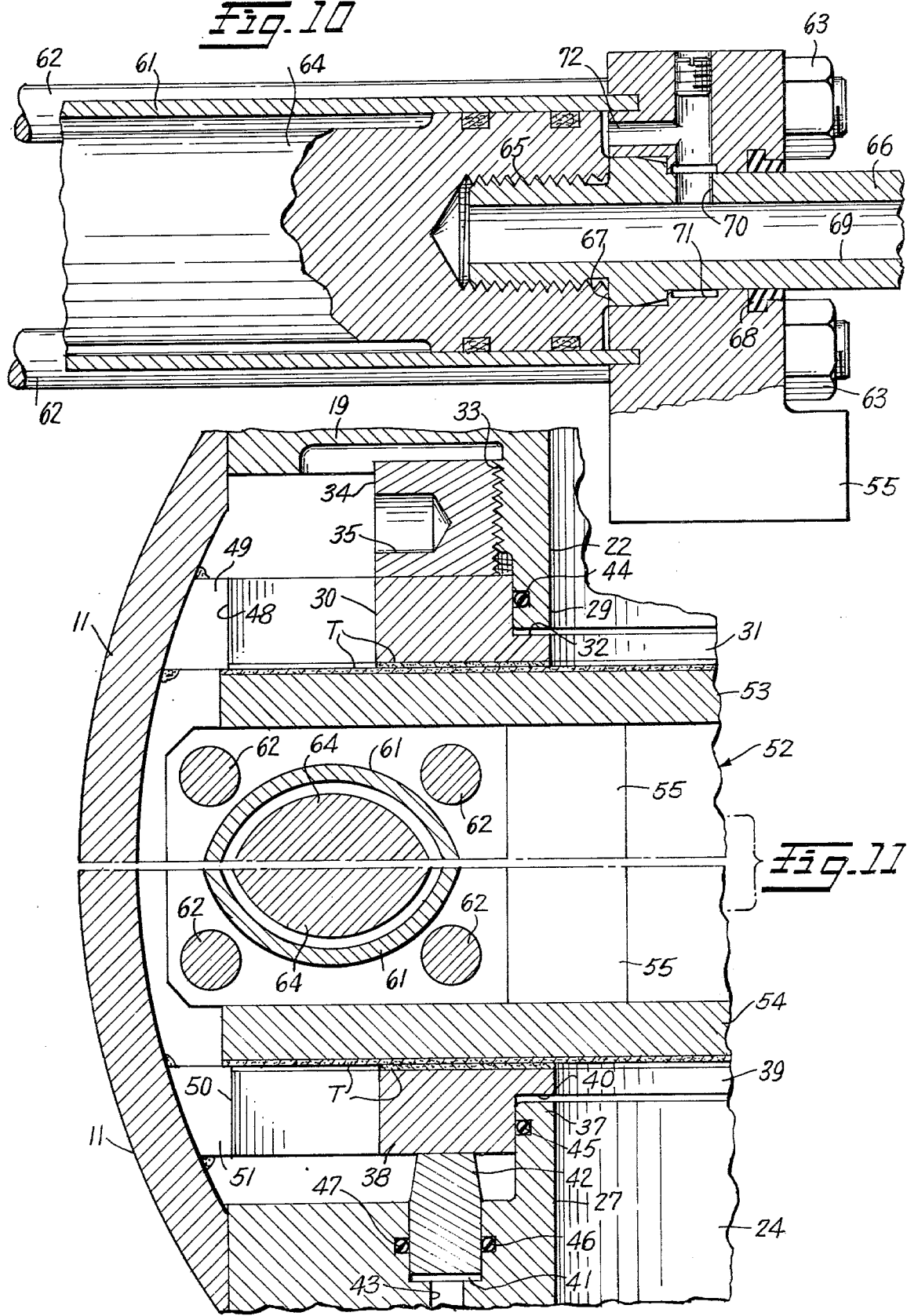

VALVE FOR USE IN HANDLING ABRASIVE MATERIALS AND METHOD OF WEAR PREVENTION

BACKGROUND OF THE INVENTION

1. Field of the Invention

The present invention relates to valves, and more particularly to a pressurizable valve for use in controlling the flow of crushed or powdered material in a lock hopper system and the like; and to a method of preventing, or reducing to a minimum, leakage between, and wear and abrasion of the stationary seating and movable parts of the valve.

2. The Prior Art

Valves for use in lock hopper systems handling crushed or powdered abrasive material such as coal, shale, dolomite, etc. are not new per se. However, most prior valves intended for such use are short-lived because the abrasive materials being handled are not effectively prevented from getting between the valve seat and the valve closure means, resulting in scoring, galling and abnormally rapid wear. Such prior valves also have the objection that abrasive material gets into the seals between the inlet and the outlet of the valve and between the pressure source and the atmosphere, which is conducive to further leakage and aggravates the need for frequent servicing.

SUMMARY OF THE INVENTION

The present invention relates to a valve construction, particularly adapted for use in pressurized systems, such as lock hopper systems and the like, for feeding crushed or powdered material to a retort, or gasifier, or reactor, etc., but which is not limited to such use, nor to use with any particular materials, including liquids.

The invention also relates to a method of preventing abrasion of the contacting fixed and movable seating surfaces of the valve.

The valve comprises a casing including a cylindrical body closed at each end by a circular cover. The body has axially aligned inlet and outlet chambers midway of its length, extending at right angles to the axis of the body. A fixed wear plate is located at the lower end of the inlet chamber and a floating wear plate is located at the upper end of the outlet chamber. A movable valve plate assembly is disposed between the fixed and floating wear plates in a horizontal plane common to the valve body axis, and comprises a pair of spaced apart, upper and lower valve plates. The upper valve plate is engaged by the fixed wear plate and the lower valve plate is engaged by the floating wear plate. A loading ring is disposed below the floating wear plate and is actuated upwardly by fluid under pressure to form a seal with the lower valve plate, and at the same time hold the upper valve plate in sealing engagement with the fixed wear plate. The contacting surfaces of the wear plates and the valve plates are provided with a layer of tungsten carbide fused thereto and ground to a 16 micro finish to render wear negligible.

The movable valve plates are generally oblong in shape and are connected at their corners to the opposite flat sides of generally rectangular blocks. A cylinder is disposed between the spaced valve plates adjacent to their longitudinal edges. The rectangular blocks are designed to also serve as a head for the cylinders. The blocks at the ends of the cylinders at each side edge of the valve plate assembly are interconnected by tie rods.

Each cylinder contains a stationary piston having a rod, or guide, extending axially therefrom at its opposite ends. The rods extend through openings in the blocks and have the end thereof remote from the piston connected to a cover, whereby the rods are held against longitudinal movement. At the same time, the valve plate assembly is supported by the rods and is free to be reciprocated on the rods from one extreme position (closed) to another extreme position (open). The valve plates include imperforate areas that block flow from the inlet chamber to the outlet chamber when in closed position and have port means in another area thereof, which registers with the inlet and outlet chambers when in open position.

The rod ends are disposed diametrically of the covers, so that the movable valve plate assembly can be moved back and forth bodily in a horizontal plane including the axis of the cylindrical body. The valve plate assembly thus may be likened to a carriage that is floatingly mounted upon the rods for reciprocating movement within the valve casing. Hydraulic operating fluid is supplied through passageways in the rods and blocks to the opposite ends of the cylinders for shifting the position of the valve plate assembly from closed to open position, and vice-versa. The supply of operating fluid to the cylinders is controlled by a solenoid valve. The cylinder operating fluid is filtered to remove any foreign solids that may be entrained therein, and in installations wherein it is subjected to high temperatures, it is circulated through a heat exchanger to effect cooling thereof.

In some installations, it may be desirable to provide the capability of pressurizing the valve casing by either gas or liquid. In either instance, the pressure of the casing pressurizing fluid is preferably maintained at a value slightly less than the pressure supplied to the loading ring, but higher than that in the system in which the valve is installed. Such pressure relationship prevents the passage of all material between the valve plates and the wear plates. Thus, abrasion of the valve plates and wear plates is prevented. Here again, if the liquid used to pressurize the casing is subjected to high temperatures, the same is filtered and cooled by circulating it through a heat exchanger.

Accordingly, the principal object of the invention is to provide a valve that has a high resistance to abrasion and leakage.

An equally important object is to provide a method for preventing scoring and galling of the stationary wear plates of a valve and the movable valve plates that are in contact therewith.

A more specific object is to provide a valve and method adapted for use in systems handling abrasive materials and which is so pressurized as to prevent the abrasive materials from getting between the seating surfaces of the valve.

A broad object of the invention is to provide a valve whose condition can be monitored without disassembling the valve for inspection.

Another object is to provide a valve that can be used in systems involving high pressures and high temperatures.

A further object is to provide a valve for use in pressurized systems for transferring contaminated liquids without altering the nature or composition of the liquid being transferred.

A still further object is to provide a valve that is versatile and adapted for use in various systems, including systems for processing crushed or powdered coal, shale, etc., to derive gas, synthetic liquid fuel, etc., therefrom.

DESCRIPTION OF THE DRAWINGS

FIG. 8 is a similar view, taken on the line 8—8 of FIG. 6.

FIG. 9 is a transverse, vertical, cross-sectional view, taken on the line 9—9 of FIGS. 6 and 7, respectively.

FIG. 10 is an enlarged, fragmentary, cross-sectional view illustrating the manner in which the guide rods are connected to the stationary piston; and FIG. 11 is a fragmentary, vertical, enlarged cross-sectional view, particularly illustrating the tungsten carbide wear surfaces on the fixed and floating wear plates and on the movable valve plates.

DESCRIPTION OF THE PREFERRED EMBODIMENTS

Figure 1:
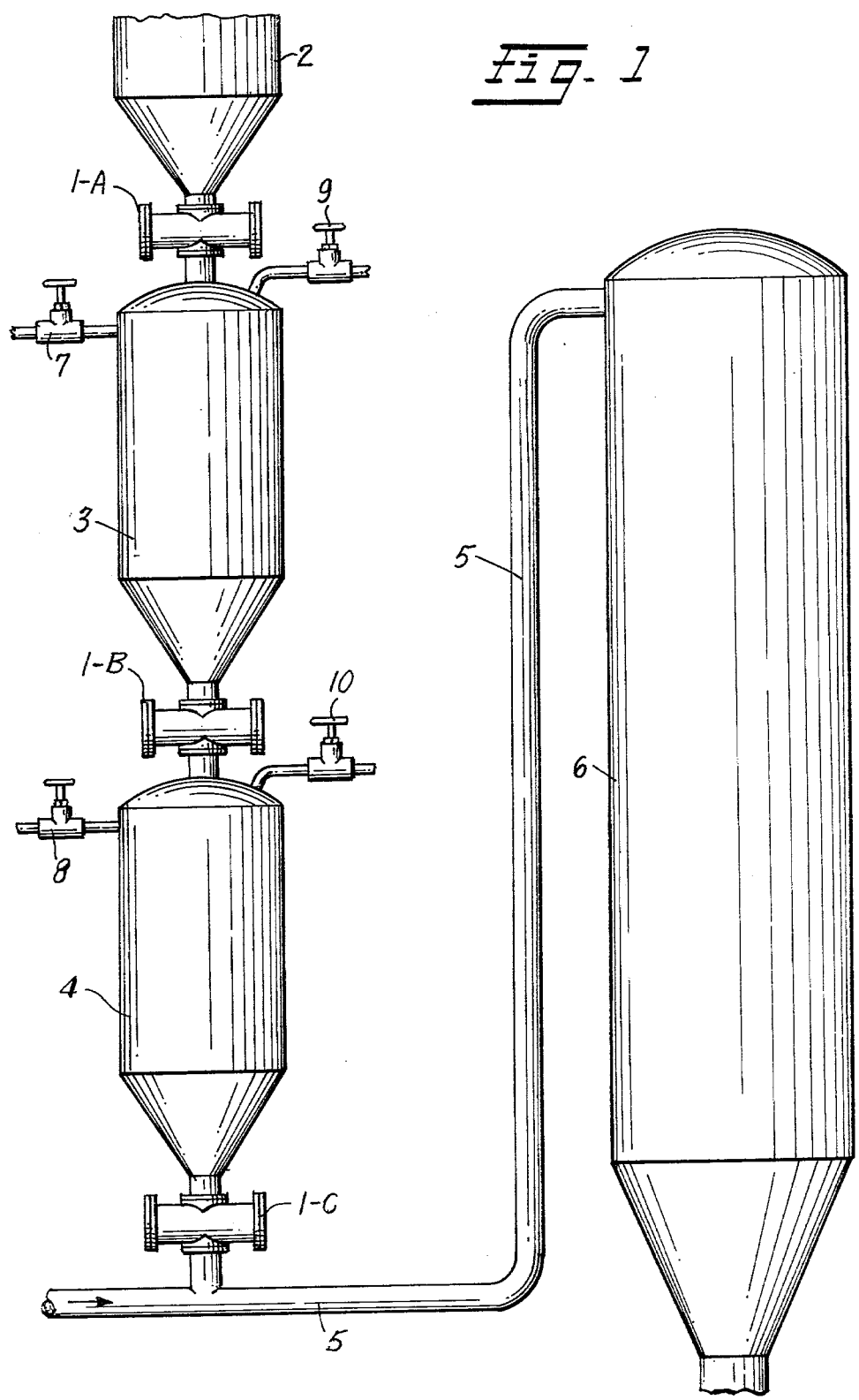
FIG. 1 is a schematic view of a typical lock hopper, gasifier system in which the valve of the present invention may be incorporated.
Figure 2:
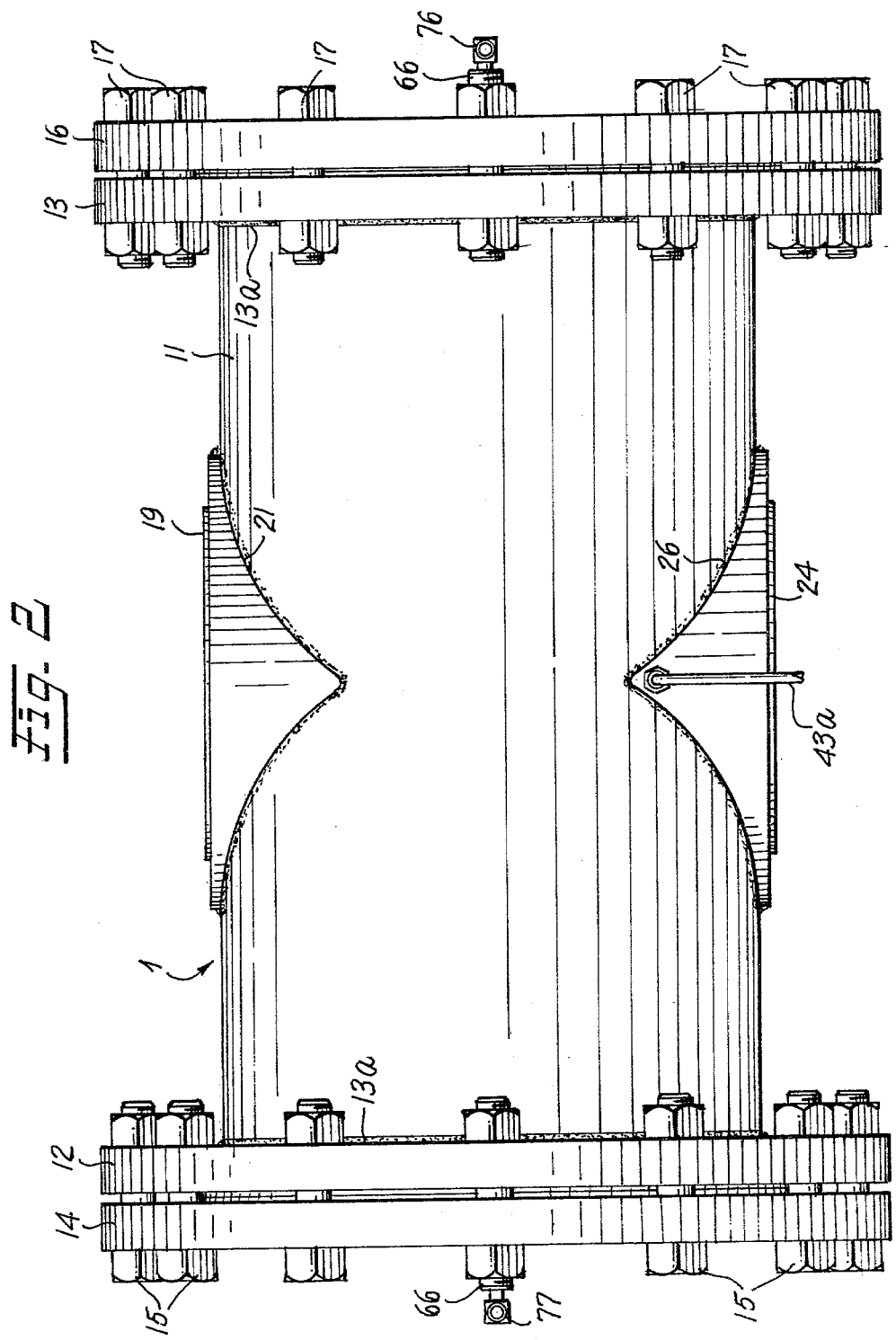
FIG. 2 is a front elevational view of the valve.
Figure 3:
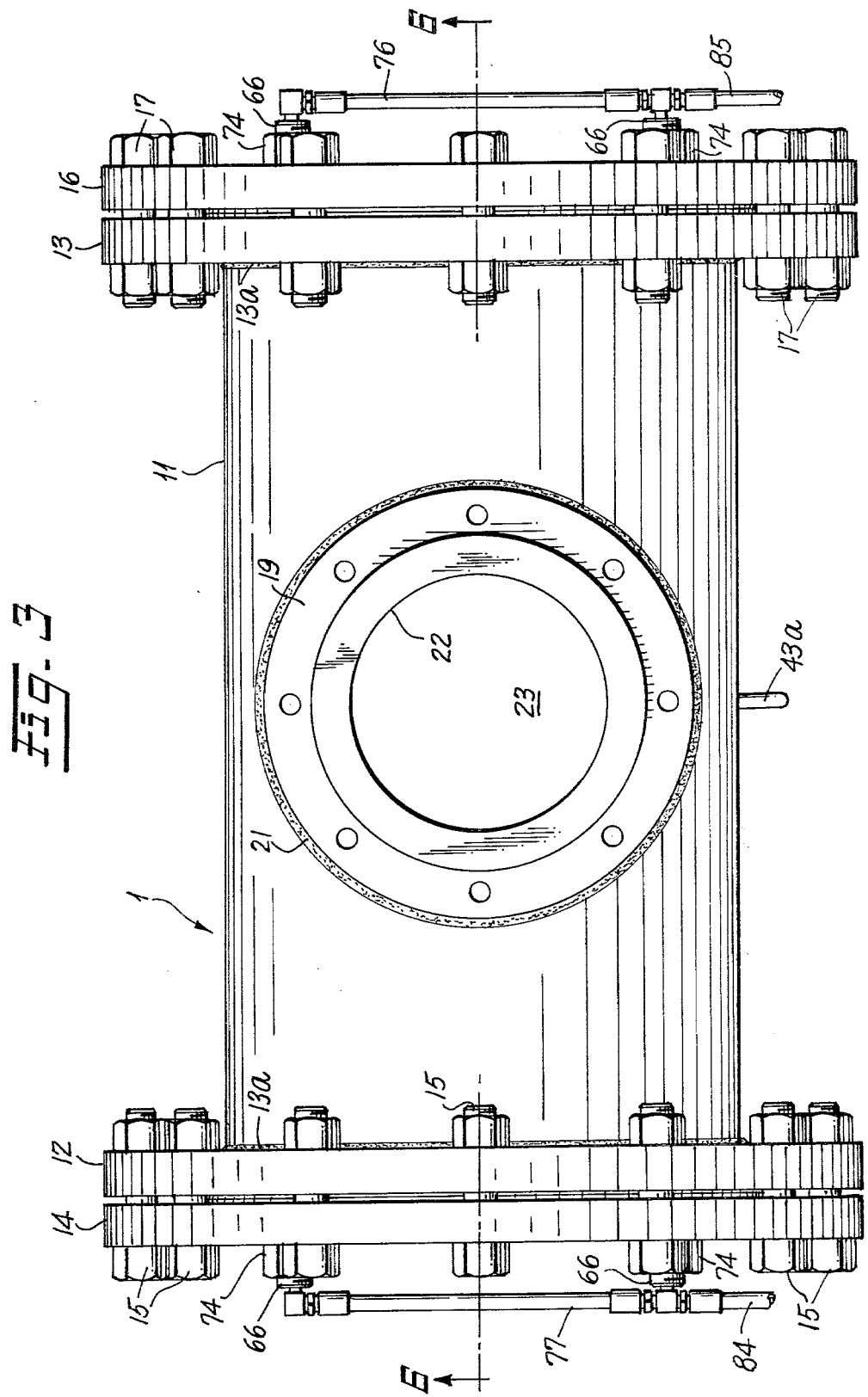
FIG. 3 is a plan view of the valve.
Figure 4:
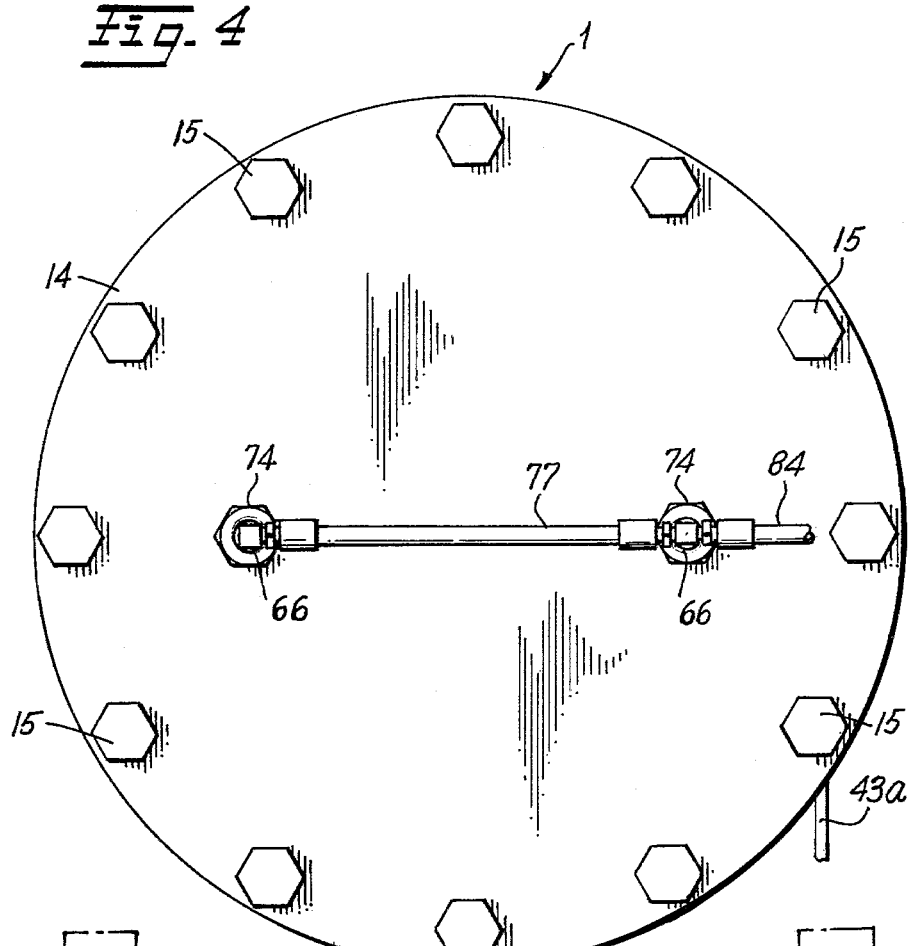
FIG. 4 is a left-end elevational view of the valve.

Referring to the drawings, the present valve is generally identified therein by the numeral 1, and is particularly well adapted for use in various high pressure systems involving the processing of crushed or powdered material such as coal, shale, dolomite, etc.

FIG. 1 diagrammatically illustrates the use of the valve in an exemplary system involving a lock hopper, an injector, a gasifier, etc. for use in extracting gases, hydrocarbon combustibles, for production of synthetic motor fuel, and other constituents from powdered coal. Thus, a feed hopper 2 is shown with its discharge end mounted above the inlet of a first valve 1-A, which itself is mounted to discharge into a lock hopper 3. A second valve 1-B is mounted between the lock hopper 3 and an injection lock hopper 4, which typically may be at a temperature of about 350° F. A third valve 1-C is located between the discharge end of the injection lock hopper 4 and a steam line 5, which may supply superheated steam to the system at a temperature of about 600° F. or higher. The steam line 5 carries the material from the injection hopper 4 to a gasifier 6, which may be operated at a temperature of up to 2,000° F. The respective pressures in the components of the system may vary, depending upon the nature, fineness, etc., of the material being processed and the extractions to be made therefrom. Such pressures may run as high as 2,000 p.s.i.

The lock hopper system shown does not form any part of the present invention, but as a matter of general information, and to illustrate one application of the present valve to a pressurized system, the operating cycle may be as follows, with possible variations: The valve 1-A is closed. The valve 1-B between the lock hopper 3 and the injection hopper 4 is opened. Both hoppers 3 and 4 are pressurized to a given pressure by gas by opening valves 7 and/or 8. The valve 1-B is then closed and the upper lock hopper 3 is vented to the atmosphere through a valve 9. Valve 1-A is opened and the lock hopper 3 is filled with crushed or powdered coal from the feed hopper 2. The valve 1-A is then closed. The valve 7 is opened to pressurize the lock hopper 3 to the same pressure as that in the injection hopper 4. The valve 1-B is then opened and the material is discharged from the lock hopper 3 into the injection hopper 4. The valve 1-B is then closed and the valve 1-C is open to allow the material to pass from the injection hopper 4 into the steam line 5 where it is carried to the gasifier 6 for the desired processing. When the hopper 4 is empty, the valve 1-C is closed and the hopper 4 is vented to the atmosphere by opening the valve 10. Valve 9 is opened to vent hopper 3. The cycle can then be repeated by opening the valve 1-B, pressurizing hoppers 3 and 4, etc.

Figure 6:
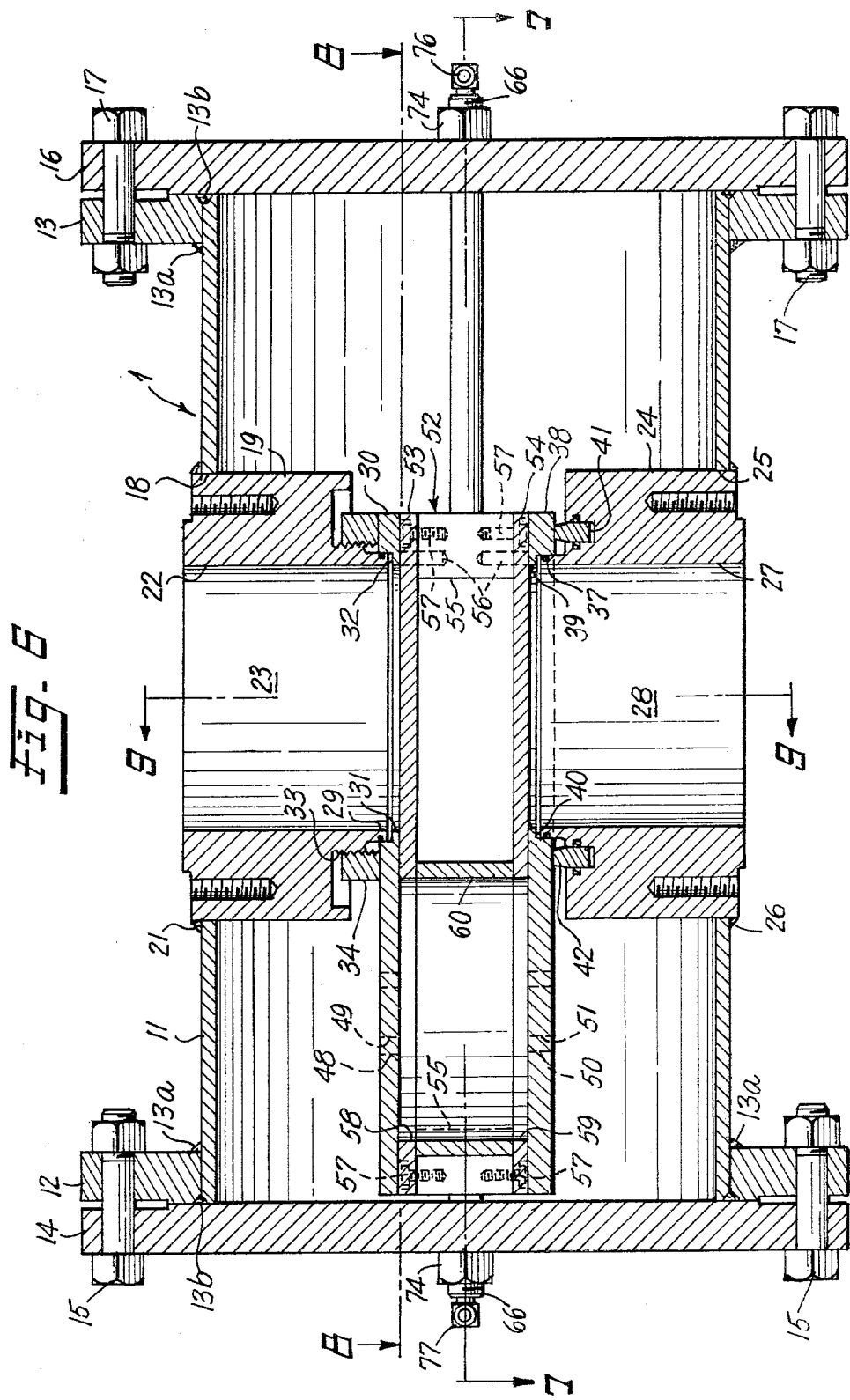
FIG. 6 is a longitudinal, vertical, cross-sectional view of the valve, taken on the line 6—6 of FIG. 3.

Considering now the construction of the valve 1, the same comprises a casing having a cylindrical main body portion 11 with rings 12 and 13 welded at 13a and 13b to the opposite ends thereof, as shown in FIG. 6. A circular cover 14 is secured to the ring 12 by bolts 15, and a similar cover 16 is secured to the ring 13 by bolts 17. The valve body 11 has an opening 18 in which an upper cylindrical body member 19 is mounted and welded in place, as indicated at 21. The body member 19 has a bore 22 which provides an inlet chamber 23. A second, or lower, cylindrical body member 24 is mounted in an opening 25 in the body 11 and is secured in place by welding, as indicated at 26. The member 24 has a bore 27 to provide an outlet chamber 28. As will be noted, the inlet chamber 23 and the outlet chamber 28 are axially aligned and disposed at right angles to the axis of the valve body 11.

The lower end of the body member 19 has a reduced extension 29 upon which a so-called fixed wear plate 30 is mounted. Wear plate 30 is "fixed" only in the sense that it is stationary and not movable lengthwise in the casing. The wear plate 30 has an opening 31 aligned with the inlet chamber 23, and is rabbetted at 32 to receive the extension 29. The extension 29 also is provided with external threads 33 to receive a locking ring 34, the purpose of which will be explained more fully hereinafter. The locking ring 34 has a hole 35 to receive a spanner wrench (not shown); and is held in adjusted position by a brass set screw 36, all as is best shown in FIG. 9.

The lower cylindrical body member 24 has an extension 37 at its upper end upon which is mounted a so-called floating wear plate 38. The wear plate 38 has an opening 39 aligned with the outlet chamber 28 and is rabbetted as indicated at 40 for mounting the same upon the extension 37. The plate 38 "floats" in the sense that it is free to move axially on the extension 37, but otherwise is stationary. A groove 41 is formed in the upper end of the cylindrical body member 24 to receive a loading ring 42 that engages the lower side of the floating wear plate 38. A passageway 43 in the member 24 communicates with the bottom of the groove 41, as is best shown in FIG. 9. The loading ring 42 is actuated by fluid under pressure supplied to the passageway 43 through a conduit 43a. Gas or air pressure may be used as the pressurizing medium, but a hydraulic system may be used as an alternative. Thus, a sump 43b contains oil that is withdrawn by an electric motor driven pump 43c and delivered through a check valve 42a to the conduit 43a. A pressure switch 43d is connected to the conduit 43a and controls the circuit 43e of the motor of the pump 43c. A pressure gauge 43f indicates the pressure of the fluid being supplied to actuate the loading ring 42. This pressure can be maintained at a given value by an adjustable pressure relief valve 43g connected in a branch conduit 43h installed on the discharge side of the pump 43c. A conduit 43j returns excess fluid to the sump 43b. An accumulator 43k is connected with the conduit 43a, as shown, enabling the pump 43c to operate intermittently. A branch conduit 43L containing a shut-off valve 43m connects the conduit 43a with the valve body 11 through a fitting 43n, making it possible to pressurize the valve 1 with fluid at the same pressure as that applied to the loading ring 42.

The wear plate 30 is sealed against fluid leakage by an O-ring 44 mounted in an external groove in the extension 29, as shown in FIG. 11. In a similar manner, the floating wear plate 38 is sealed with respect to extension 37 by an O-ring 45. The loading ring 42 is sealed in the groove 41 by an internal O-ring 46 and an external O-ring 47.

Figure 7:
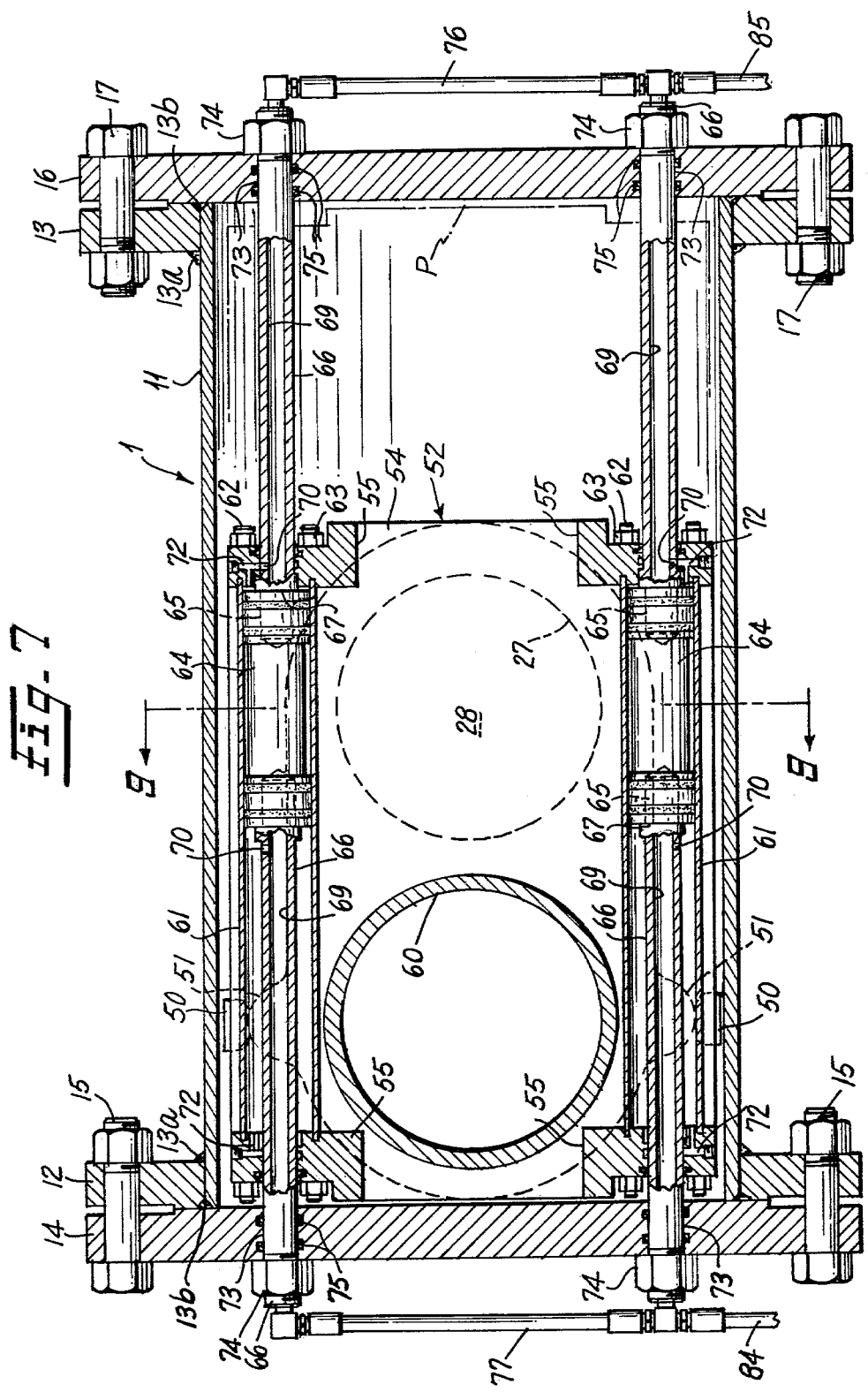
FIG. 7 is a longitudinal, horizontal, cross-sectional view, taken on the line 7—7 of FIG. 6.

The fixed wear plate 30 has laterally extending lobes 49 (FIGS. 7, 8 and 9) that engage stops 49 welded to the interior of the valve body 11 to prevent any substantial rotary movement of the wear plate 30 on the extension 29. Similarly, the floating wear plate 38 has lobes 50 that engage stops 51 welded to the casing to likewise prevent any substantial rotary movement on the extension 37, without preventing axial movement thereof on said extension. Disposed between the fixed wear plate 30 and the floating wear plate 38 is a movable valve plate assembly, generally identified by numeral 52. This valve plate assembly comprises an upper valve plate 53, the upper surface of which is engaged with the lower face of the fixed wear plate 30; and a similar lower valve plate 54, the lower surface of which is engaged with the upper face of the floating wear plate 38. The valve plates 53 and 54 are generally oblong in shape, as shown in FIGS. 7 and 8, and are connected to the opposite flat sides of a generally rectangular block 55 at each corner thereof. The connecting means consists of an indexing dowel 56 and a countersunk cap screw 57 (FIGS. 6 and 8) which provide a rigid valve plate assembly. The upper valve plate 53 has an opening 58 that is axially aligned with a similar opening 59 in the lower valve plate 54. A cylindrical member is disposed in the space between the valve plates 53 and 54 and cooperates with the openings 58 and 59 to form a port 60 through the valve plate assembly. The port 60 is adapted to register with the inlet and outlet chambers 23 and 28, respectively, as will appear more fully hereinafter. The valve plates 53 and 54 have imperforate areas to the right of port 60, which block communication between the chambers 23 and 28 when the valve is in closed position, as will be understood from FIGS. 6 and 7.

The present valve is designed so as to minimize wear between the seating areas of the wear plates and the movable valve plate assembly. Thus, the lower face of the fixed wear plate 30, the upper face of the floating valve plate 38, and the outer faces of the movable valve plates 53 and 54 are provided with a fused layer of tungsten carbide T, as best illustrated in FIG. 11. The tungsten carbide surfaces T are ground to a 16 micro finish, whereby wear of the contacting surfaces is completely eliminated or rendered negligible.

As is best shown in FIG. 7, the blocks 55 also serve as a head for the end of cylinders 61, which latter are arranged in parallel relation between the valve plates 53 and 54. The blocks 55 are held in tight engagement with the ends of their associated cylinders 61 by four tie rods 62, the ends of which extend through the blocks and are threaded to receive nuts 63.

A stationary piston 64 (FIG. 7) is mounted in each cylinder 61 and is disposed midway of the length of the valve body 11. As is best shown in enlarged scale in FIG. 10, the piston 64 has a threaded bore 65 to receive the threaded inner end of a hollow piston rod, or guide, 66. The rod 66 has a shoulder 67 adjacent its threads that abuts against the end face of the piston 64. Each rod 66 extends freely through an opening in one of the blocks 55. Thus, each fixed piston 64 is connected to a pair of axially aligned rods 66, and each rod 66 is sealed against leakage relative to its associated block 55 by a packing ring 68 mounted in the block.

Each of the rods 66 is hollow and contains a passageway 69 (FIGS. 7 and 10) for operating fluid under pressure. The rods 66 also have a lateral port 70, branching from each passageway 69 adjacent to the piston 64, that communicates with a groove 71 in the respective blocks 55, and which grooves in turn communicate with passage means 72 in the blocks leading into the adjacent ends of the cylinders 61. The outer ends of the rods 66 extend through openings 73 in the covers 14 and 16 to a point slightly beyond their associated covers, and are threaded to receive a nut 74, which restrains the rods 66 and the pistons 64 connected thereto against longitudinal movement in the valve casing. The rods 66 are sealed against leakage relative to the covers 14 and 16 by packing rings 75 mounted in the covers, as shown in FIG. 7. The passageways 69 in the rods 66 at the right hand end of the valve casing are interconnected by a conduit 76, which supplies operating fluid thereto for effecting bodily movement of the valve plate assembly 52 to the right, to the position indicated in phantom lines P. Similarly, the passageway 69 in the rods 66 at the left hand end of the valve casing are interconnected by a fluid pressure supply conduit 77 for effecting bodily movement of the valve plate assembly 52 toward the left to the full line position, as shown in FIG. 7. Thus, the valve plate assembly 52 can be reciprocated in the valve casing from one extreme (closed) position shown in full lines, to another extreme (open) position shown in phantom lines P, wherein it will be understood that the valve port 60 is aligned with and establishes communication between the inlet chamber 23 and the outlet chamber 28.

When the valve 1 is installed in a lock hopper system, the inlet chamber 23 is normally under a lower pressure than the outlet chamber 28; wherefore, there is a differential of pressure across the valve plate assembly 52. This differential would normally produce a side thrust upon the valve plate assembly 52 and impose undesirable bending stresses upon the guide rods 66. To counteract any such side thrust, the locking ring 34 is adjusted to maintain the fixed wear plate 30 in contact with the upper side of the valve plate assembly 52 so that all side thrust on the rods 66 is counteracted.

Figure 5:
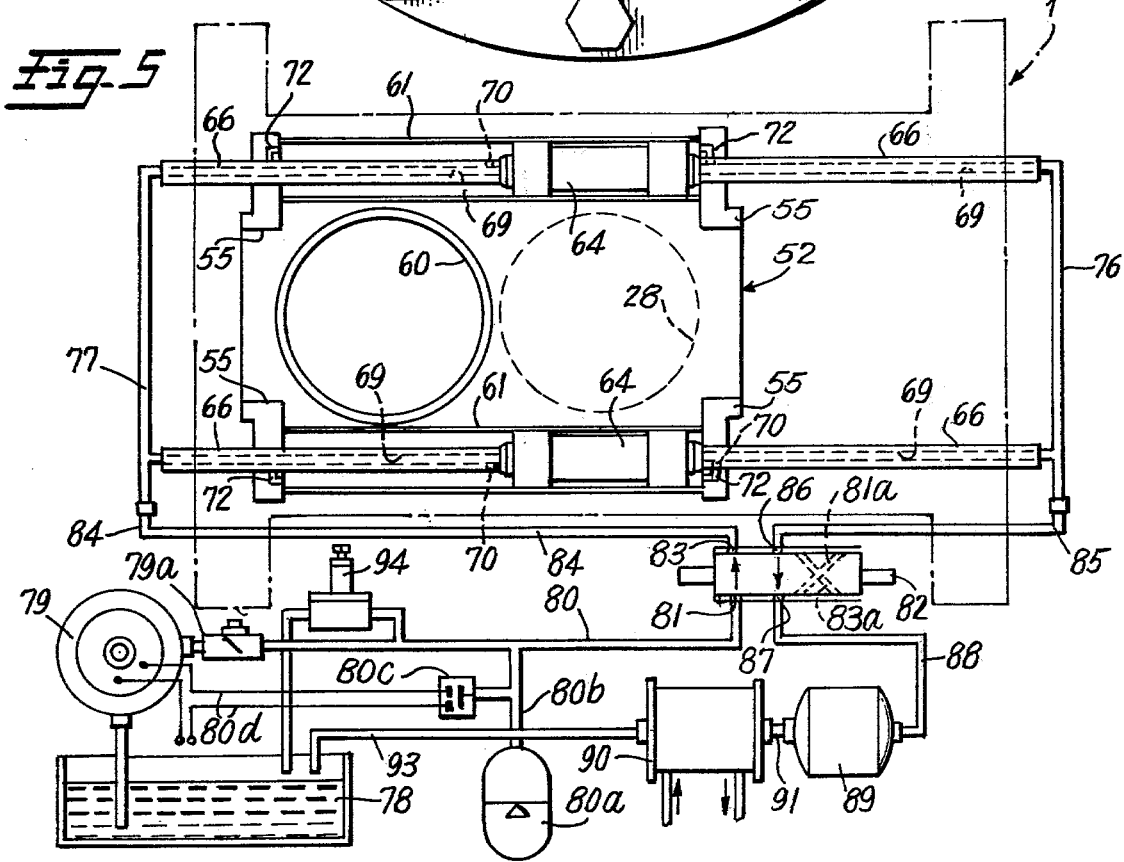
FIG. 5 is a schematic view of the hydraulic system for controlling the operation of the valve plate assembly.

Referring now to FIG. 5, reciprocating movement of the valve plate assembly 52 is effected by the hydraulic control system diagrammatically illustrated therein. Thus, a sump 78 preferably contains oil for use as a hydraulic medium for operating the cylinders 61. An electric motor driven pump 79 withdraws oil from the sump 78, pumps it past a check valve 79a and delivers it to a conduit 80 connected to a supply port 81 of a solenoid valve 82. An accumulator 80a is connected with the conduit 80 by a conduit 80b in which is mounted a pressure switch 80c that controls the circuit 80d of the motor of pump 79. A port 83 of the solenoid valve 82 is aligned with the port 81 and is connected by a conduit 84 to the conduit 77 communicating with the left end of the piston rods 66. Under such circumstances, operating fluid is admitted to the left end of the cylinders 61 to move the valve plate assembly 52 to the left, to its closed position, as shown. The conduit connected to the right end of the rods 66 is connected by a conduit 85 to a port 86 of the solenoid valve 82. An exhaust port 87 for spent operating fluid is aligned with the port 86 and is connected by a conduit 88 with the inlet of a filter 89. Thus, while pressure fluid is being admitted to the left end of the cylinders 61, spent operating fluid is being exhausted from the right end of said cylinders. The outlet of the filter 89 is connected to the inlet of a heat exchanger 90 by a conduit 91, and the outlet of the heat exchanger 90 communicates with a conduit 93, which returns the cooled oil to the sump 78. An adjustable pressure relief valve 94 is connected in the conduit 80 between the pump 79 and the solenoid valve 82 for maintaining the desired operating fluid pressure and returning excess fluid to the sump 78.

The core of the solenoid valve 82 includes a passage 83a, which, when aligned with the ports 83 and 87, enables operating fluid to exhaust from the left end of the cylinders 61. A similar passageway 81a simultaneously establishes communication between the ports 81 and 86 to admit operating fluid into the right end of the cylinders 61 to bodily shift the valve plate assembly 52 to the right to align the port 60 with the inlet and outlet chambers 23 and 28, respectively, to open the valve. The solenoid valve is normally manually operated to control the opening and closing of the valve 1.

In installations where the valve casing is pressurized by air or gas, a fitting 95 (FIG. 9) is mounted in the valve body 11 and a supply conduit 96 is connected thereto. A shut-off valve 97 is connected in the conduit 96, and an adjuatable pressure regulating valve 98 is arranged in the conduit 96 beyond the shut-off valve 97 to maintain the maximum pressure desired in the casing. A pressure gauge 99 is connected in the conduit 96 between the pressure regulating valve 98 and a check valve 100. The check valve 100 is particularly desirable in installations where liquid is available as an alternative medium for pressurizing the valve casing. Both the gas and liquid pressure systems are schematically illustrated in FIG. 9.

With reference to the liquid system for pressurizing the casing, a filler plug 101, mounted in the upper part of the valve body 11 is removed to enable the system to be filled with the pressurizing liquid. A pump 102 is connected to the valve body 11 by a conduit 103 and communicates with a pressure relief valve 104. The conduit 103 is connected by a fitting 105 to the lower portion of the valve body 11. A similar fitting 106 is mounted in the upper portion of the valve body 11 and has a conduit 107 connected thereto. A shut-off valve 108 is connected in the conduit 107 and a vent valve 109 is mounted between the shut-off valve 108 and the fitting 106. The vent valve 109 can be opened whenever it is desired to vent air or gas to the atmosphere. A pressure gauge 110 is connected in the conduit 107 to indicate the pressure within the valve casing. A filter 111 is connected in the conduit 107 at a point beyond the pressure gauge 110, and, in turn, is connected to a heat exchanger 112 by a conduit 113. A conduit 114, connected to the outlet of the heat exchanger 112, returns cooled fluid to the pump 102. A return conduit 115 connects the relief valve 104 with the conduit 114. A pipe 116 containing a drain cock 117 is mounted in the lower portion of the valve body 11 to empty the same, when desired.

The pump 102 pressurizes the system and circulates the pressurizing liquid through the casing, filter 111, and heat exchanger 112 to cool the valve 1. Thus, a pressurized, closed loop is provided. The areas of the fixed wear plate 30, the floating wear plate 38, the valve plates 53 and 54, the port member 60, the cylindrical body members 19 and 24, and the cylinders 61, exposed to the pressurizing liquid, are cooled thereby. Thus, by maintaining the valve casing in a cool condition, excessive thermal expansion of the valve components is avoided and heat damage to the o-ring seals, etc., is minimized. Further, the pressurized system minimizes and avoids wear of the valve plates by preventing abrasive material from getting between the plates. In this connection, any fluctuations in the liquid pressure that might occur can be compensated by opening the valve 97 to admit air or any suitable gas under the desired pressure into the valve casing above the liquid therein. While the feature of pressurizing the valve casing has been emphasized, it will be understood that the present valve can be used in environments wherein such pressurizing may not be necessary, even though pressure is used to actuate the loading ring 42.

When the valve 1 is first placed in operation, the fixed wear plate 30 and the floating wear plate 38 are preloaded by applying fluid under pressure to the loading ring 42. The valve casing is then pressurized with either gas or oil to a pressure equal to, or preferably slightly less than the loading pressure. When installed in a lock hopper system, or the like, the casing pressure is higher than the system pressure, i.e., the pressure in the valve inlet and outlet chambers 23 and 28, respectively. In most such systems, the pressure in the outlet chamber 28 will be higher than in the inlet chamber 23 when the valve 1 is closed. However, in some cases these pressure conditions would be reversed. Oil would normally be used, but in some systems any liquid at all that might pass between the valve plates would be detrimental to the process, wherefore, air or a gas would be used instead.

By pressurizing the valve casing at a level above the system pressure, abrasive material is prevented from getting in between the valve plates. Therefore, the only wear that would be created would result from metal to metal friction. Such wear is practically eliminated in the present valve plate design by fusing a layer of tungsten carbide T to their confronting surfaces and grinding the same to a 16 micro finish. Wear is thus rendered negligible. In situations where oil can be used for casing pressurization, the likelihood of wear occurring is even less.

The condition of the valve can be monitored without taking the same apart for visual inspection. Thus, the amount of liquid fed to maintain the valve casing pressurized would be proportionate to valve wear. The amount fed would indicate to an experienced operator when the valve plates need replacing or resurfacing. The condition of the valve plates can be further monitored by periodically drawing a sample of the pressurizing liquid from the casing and analyzing it for content of whatever abrasive material is being handled, as well as for content of metal, if any, worn from the valve plates.

Any material accumulated in the filter 112 will also serve to indicate the condition of the valve.

When the present valve 1 is used in a system for transferring contaminated liquids, a portion of the contaminated liquid (filtered) is circulated through the valve casing to cool and pressurize the casing so that if there is any leakage of the pressurizing fluid into the system, it would not change the nature or composition of the liquid being handled. The filtered, contaminated liquid can also be used to pressurize the loading ring 42.

The present valve is well suited for high temperature installations and can be designed to satisfy any workable pressure requirements. Thus, the casing pressurization liquid can be used as a coolant by circulating it through the heat exchanger 112. Thermal expansion of the valve plates is compensated for by the floating valve plate 38. Thus, there is no danger of scoring or galling due to expansion. The thermal linear expansion of the guide rods 66 normally would be substantially equivalent to the expansion of the valve casing. However, the rods 66 can be readily designed so as to be anchored to a cover only at one end, if the expansion rates are significantly different.

The terms "upper," "lower," "above," "below," "horizontally" "vertically," and the like are used herein only in a descriptive and not a limiting sense with respect to the valve parts as depicted in the drawings, inasmuch as it is contemplated that in some installations the valve will be installed in a reversed position from that illustrated, in which event what has been described as an outlet chamber may actually be an inlet chamber and be under less pressure than the actual outlet chamber.

It will be understood that various changes may be made in the details and arrangement of the valve components illustrated and described herein without departing from the principles of the invention or the scope of the annexed claims.

I claim:

1. A valve, comprising: a casing including an elongated body; means in said body providing an inlet chamber; means in said body providing an outlet chamber, said inlet and outlet chambers being axially aligned, with the axis of said chambers disposed at right angles to the axis of said body; ported valve plate means in said casing disposed between said chambers arranged to control flow of material from said inlet chamber into said outlet chamber; separate stationary guide means mounted in said body extending from one end to the other end thereof; means mounting said valve plate means for reciprocating movement on said guide means to position its port in and out of registration with said chambers; and means for reciprocating said mounting means including means in said casing surrounding said guide means and supported between said mounting means to effect said reciprocating movement of said valve plate means.

2. A valve as described in claim 1, in which the means providing the inlet chamber is cylindrical and has a fixed wear plate at its lower end, and wherein the movable valve plate means has an upper side engaged by said fixed wear plate.

3. A valve as described in claim 2, including means for adjusting the fixed wear plate relative to the movable valve plate means.

4. A valve as described in claim 2, in which the means providing the outlet chamber is cylindrical and has a floating wear plate at its upper end, and wherein the movable valve plate means has a lower side engaged by said floating wear plate.

5. A valve as described in claim 4, including a loading ring arranged to maintain the floating wear plate in sealing contact with the movable valve plate means; and means for applying fluid pressure to said loading ring.

6. A valve as described in claim 1, in which the means providing the inlet chamber is cylindrical and has a fixed wear plate at its lower end, said movable valve plate means having an upper side engaged by said fixed wear plate; and in which the means providing the outlet chamber is cylindrical and has a floating wear plate at its upper end, said movable valve plate means having a lower side engaged by said floating wear plate; and a loading ring arranged to maintain the floating wear plate in sealing contact with the movable valve plate means; and means for applying fluid pressure to said loading ring.

7. A valve as described in claim 6, including means arranged to admit fluid into said valve body to pressurize said valve body to prevent material flowing through the valve from getting between said fixed and floating wear plates and said movable valve plate means.

8. A valve as described in claim 7, including a closed conduit system, connected with the fluid admitting means to supply fluid under pressure to the valve body, comprising a filter, a heat exchanger, a pressure relief valve, and a circulating pump connected with said conduit system.

9. A valve as described in claim 6, wherein the means for applying fluid pressure to the loading ring includes conduit means connected to the valve body; and a pump, an accumulator, a pressure responsive switch, and a pressure regulating valve connected with said conduit means for maintaining a desired given pressure on said loading ring.

10. A valve, comprising: a casing including an elongated cylindrical body and a cover closing each end of said body, said body having an inlet chamber and an outlet chamber axially aligned with said inlet chamber; a valve plate assembly disposed diametrically in said body between said chambers arranged to control the flow of material from said inlet chamber into said outlet chamber; means in said body including separate stationary guide means supporting and mounting said valve plate assembly for bodily reciprocating movement on said guide means relative to said chambers, from one extreme position to another extreme position, said valve plate assembly including at least one valve plate having an imperforate area for obstructing communication between said chambers when in said one extreme position, and having a port that registers with said chambers for establishing communication between said chambers when in said other extreme position; and means operable to reciprocate said valve plate assembly including means surrounding said guide means and being supported between said mounting means for movement from said one extreme position to the other.

11. A valve as described in claim 10, wherein the means for mounting the valve plate assembly for reciprocating movement in the elongated body comprises means disposed lengthwise of said body; and means slidably mounting the valve plate assembly upon said lengthwise disposed means.

12. A valve as described in claim 10, wherein the mounting means for the valve plate assembly comprises guide rods arranged in spaced parallel relation and extending through the elongated body from the cover at one end thereof to the cover at the other end thereof.

13. A valve as described in claim 10, wherein the mounting means for the valve plate assembly includes a pair of cylinders arranged in parallel; a stationary piston disposed in each cylinder; and a pair of guide rods axially aligned with each piston and having one end thereof connected to the piston and its other end mounted in one of the end covers.

14. A valve as described in claim 13, wherein the stationary pistons are located midway between the covers.

15. A valve as described in claim 10, wherein the movable valve plate assembly includes a pair of generally oblong-shaped ported valve plates; a pair of cylinders, one disposed adjacent each longitudinal edge of said valve plates; a cylinder head at the ends of each cylinder; a stationary piston disposed in each of said cylinders at a point midway between said covers; two pairs of stationary guide rods, each pair having an inner end connected to one end of one of the stationary pistons, and an outer end fastened to one of said covers, each rod extending through one of said cylinder heads and having passage means communicating at its inner end with a passage in its associated cylinder head to supply operating fluid to said cylinders for moving said cylinders and valve plate assembly bodily along said guide rods.

16. A valve as described in claim 15, wherein the movable valve plate assembly comprises, in addition, a generally rectangular block at each end of each cylinder, serving as a cylinder head; and a plurality of tie rods interconnecting the blocks associated with each cylinder; and wherein the valve plates are mounted upon opposed sides of said blocks, one above and one below said pair of cylinders.

17. A valve as described in claim 10, wherein the inlet chamber is formed by an upper cylindrical member mounted in the body, said upper cylindrical member having a cylindrical extension at its lower end; a fixed wear plate mounted upon said extension, said fixed wear plate having an opening aligned with said inlet chamber, said extension also having an externally threaded portion above said fixed wear plate; and an adjusting ring mounted upon said threaded portion and engaging the upper side of said fixed wear plate to hold it in sealing engagement with the upper side of the valve plate assembly.

18. A valve as described in claim 10, wherein the outlet chamber is formed by a lower cylindrical member mounted in the body, said lower cylindrical member having a cylindrical extension at its upper end; a floating wear plate mounted upon said extension, said lower cylindrical member having a groove in its upper end surrounding said extension; and a loading ring in said groove engaging the lower side of said floating wear plate, said lower cylindrical member having a passageway for pressure fluid communicating with said groove below said loading ring for applying pressure to said floating wear plate to move it axially on said extension into sealing engagement with the lower side of the valve plate assembly.

19. A valve, comprising: a casing including an elongated hollow body; a closure cover mounted upon each end of said casing, said casing having an inlet chamber, an outlet chamber; a movable valve plate assembly disposed between said chambers arranged to control the flow of material from said inlet chamber into said outlet chamber, said movable valve plate assembly comprising a pair of cylinders; a stationary piston disposed in each of said cylinders midway between said covers; and two pairs of stationary guide rods, means for mounting said valve plate assembly for sliding engagement on said pair of guide rods, said mounting means surrounding said guide means each pair of guide rods having an inner end connected to one end of one of the stationary pistons, and an outer end fastened to one of said covers, each rod having passage means communicating at its inner end with its associated cylinder to supply operating fluid for moving said valve assembly along said guide rods; an upper cylindrical member mounted in said body providing an inlet chamber, said upper cylindrical member having a cylindrical extension at its lower end; a stationary wear plate mounted upon said extension, said stationary wear plate having an opening aligned with said inlet chamber, said extension having an externally threaded portion above said stationary wear plate; an adjusting ring mounted upon said threaded portion and engaging the upper side of said stationary wear plate; a lower cylindrical member mounted in said body in axial alignment with said upper cylindrical member, said lower cylindrical member having a cylindrical extension at its upper end; a floating wear plate mounted thereon, said lower cylindrical member having a groove in its upper end surrounding its aforesaid extension; a loading ring in said groove engaging the lower side of said floating wear plate, said lower cylindrical member having a passageway for pressure fluid communicating with said groove below said loading ring for applying pressure to said floating wear plate; and means for pressurizing said loading ring to sealingly engage said floating wear plate with said valve plate assembly; and means for pressurizing said casing to prevent material from getting between said stationary and floating wear plates and said valve assembly.

20. A valve as described in claim 19, wherein the means for pressurizing the loading ring, and the means for pressurizing the casing include separate systems respectively connected with different portions of the valve body.

21. A valve as described in claim 19, wherein the means for pressurizing the loading ring includes conduit means connected to the valve body; and a pump, an accumulator, a pressure responsive switch, and a pressure regulating valve connected with said conduit means for maintaining a desired given pressure on said loading ring.

22. A valve as described in claim 19, wherein the means for pressurizing the casing includes a closed conduit system, connected with the valve body to supply fluid under pressure thereto, comprising a filter, a heat exchanger, a pressure relief valve, and a circulating pump connected with said conduit system.

23. The method of preventing wear on the seating surfaces of a valve having a closed casing containing inlet and outlet chambers, and having valve plate means engaged with said seating surfaces for controlling flow between said chambers, comprising: applying loading pressure to maintain the valve plate means and seating surfaces in sealing contact; introducing fluid under pressure into the valve casing in surrounding relation to the valve plate means to pressurize the interior of said casing; and maintaining said loading and said casing pressure while material is flowing through the valve in such relation as to prevent abrasive material from getting between said seating surfaces and said valve plate means and into said casing.

24. The method described in claim 23, including maintaining the loading pressure on the valve plate means slightly higher than the casing pressure.

25. The method described in claim 23, wherein lubricating oil is used as the loading medium for pressurizing the valve plate means.

26. The method described in claim 23, including providing a fixed wear plate as one valve seating surface and providing a floating wear plate as another valve seating surface; disposing valve plate means between and in sliding contact with said valve seating surfaces; and applying loading pressure to said floating wear plate to hold it in sealing engagement with said valve plate means and to hold said valve plate means in sealing engagement with said fixed wear plate.

27. The method of preventing abrasion of the seating surface of a valve installed in a pressurized system handling abrasive material, said valve having a closed casing containing an inlet chamber and an outlet chamber, and valve plate means engaged with said seating surfaces and controlling the flow of abrasive material from said inlet chamber into said outlet, comprising: introducing fluid under pressure into the valve casing in surrounding relation to the valve plate means to pressurize the interior of said casing, subjecting said valve plate means to a loading pressure to maintain the same in sealing contact with said seating surfaces; and maintaining said casing pressure lower than said loading pressure, but higher than said system pressure to prevent abrasive material from getting between said seating surfaces and said valve plate means and into said casing, while fluid is flowing through the valve.

* * * * *